US010522124B2

(12) United States Patent
Lawande et al.

(10) Patent No.: US 10,522,124 B2
(45) Date of Patent: Dec. 31, 2019

(54) INFOTAINMENT SYSTEM

(71) Applicant: Harman Becker Automotive Systems GmbH, Karlsbad (DE)

(72) Inventors: Sachin Lawande, Woodbridge, IL (US); Gerhard Pfaffinger, Regensburg (DE)

(73) Assignee: HARMAN BECKER AUTOMOTIVE SYSTEMS GmbH, Karlsbad-Ittersbach (DE)

( * ) Notice: Subject to any disclaimer, the term of this patent is extended or adjusted under 35 U.S.C. 154(b) by 170 days.

(21) Appl. No.: 14/067,729

(22) Filed: Oct. 30, 2013

(65) Prior Publication Data

US 2015/0117667 A1 Apr. 30, 2015

(51) Int. Cl.
*G10H 1/00* (2006.01)
*H04M 1/60* (2006.01)
(Continued)

(52) U.S. Cl.
CPC ........... *G10H 1/0083* (2013.01); *B60K 35/00* (2013.01); *B60K 37/06* (2013.01); *H04M 1/6091* (2013.01);
(Continued)

(58) Field of Classification Search
CPC ....... H04L 67/12; H04W 4/04; H04M 1/6091; H04B 1/082; H04R 3/12; H04R 2499/13;
(Continued)

(56) References Cited

U.S. PATENT DOCUMENTS

| 4,646,063 | A | * | 2/1987 | Carson | ................. 340/384.4 |
| 4,924,191 | A | * | 5/1990 | Erb | ................. H03F 1/0244 |
| | | | | | 330/130 |

(Continued)

FOREIGN PATENT DOCUMENTS

| CN | 101210827 A | 7/2008 |
| CN | 101808854 A | 8/2010 |

(Continued)

OTHER PUBLICATIONS

Fingas, Sony unveils in car receivers with app remote taps into your smartphone music from october,engadget, 2012.*

(Continued)

*Primary Examiner* — Oyesola C Ojo
*Assistant Examiner* — Kuassi A Ganmavo
(74) *Attorney, Agent, or Firm* — Artegis Law Group, LLP

(57) ABSTRACT

An infotainment system for a vehicle may include a controllable audio reproduction arrangement that is configured to be fixed in the vehicle and to acoustically reproduce an audio signal under the control of a control signal. It may further include a portable device that is freely movable in the vehicle and that is configured to provide the audio and control signals for the audio reproduction arrangement, as well as a wireless connection between the portable device and the audio reproduction arrangement configured to transmit the audio and control signals from the portable device to the audio reproduction arrangement. The audio reproduction arrangement has amplification, quiescent power consumption and a maximum output power, of which at least one is controllable by the portable device via the control signal.

21 Claims, 3 Drawing Sheets

(51) Int. Cl.
  *B60K 35/00* (2006.01)
  *B60K 37/06* (2006.01)
  *H04M 1/725* (2006.01)

(52) U.S. Cl.
  CPC .... *B60K 2370/164* (2019.05); *B60K 2370/55* (2019.05); *B60K 2370/566* (2019.05); *B60K 2370/573* (2019.05); *B60K 2370/589* (2019.05); *H04M 1/72527* (2013.01)

(58) Field of Classification Search
  CPC ..... H03F 3/45475; B60K 35/00; B60K 37/06; B60K 2370/589; B60K 2370/55; B60K 2370/164; B60K 2370/566; B60K 2370/573
  USPC ...... 381/86, 302, 75, 77, 104–109; 330/259, 330/282, 10; 455/572
  See application file for complete search history.

(56) References Cited

U.S. PATENT DOCUMENTS

| | | | | |
|---|---|---|---|---|
| 5,012,919 A * | 5/1991 | Trapp | ..................... | B65G 1/127 198/474.1 |
| 5,130,665 A * | 7/1992 | Walden | ..................... | H03G 3/04 330/129 |
| 5,204,909 A * | 4/1993 | Cowan | ..................... | H03G 7/004 327/332 |
| 5,546,046 A * | 8/1996 | Trentino | ..................... | H03G 5/06 330/123 |
| 5,745,582 A * | 4/1998 | Shimpuku | ..................... | H04L 1/0042 381/105 |
| 5,872,481 A * | 2/1999 | Sevic | ..................... | H03F 1/0277 330/124 R |
| 6,484,040 B1 * | 11/2002 | Wang | ..................... | H04B 1/034 381/311 |
| 6,496,063 B2 * | 12/2002 | Hinrichsen | .......... | H03G 3/3042 330/129 |
| 6,782,244 B2 * | 8/2004 | Steel et al. | ................. | 455/127.1 |
| 7,863,976 B1 * | 1/2011 | Loeb | ..................... | H03F 1/0261 330/302 |
| 7,979,027 B2 * | 7/2011 | VanHarlingen | ........ | H04B 1/034 455/345 |
| 8,059,830 B1 * | 11/2011 | Gleason et al. | ................ | 381/86 |
| 2002/0131611 A1 * | 9/2002 | Hoover et al. | ................ | 381/123 |
| 2002/0132652 A1 * | 9/2002 | Steel | ..................... | H03F 1/0277 455/574 |
| 2002/0132656 A1 * | 9/2002 | Lydon | ..................... | G06Q 10/06 463/9 |
| 2004/0100323 A1 * | 5/2004 | Khanifar | ............... | H03F 1/0244 330/51 |
| 2006/0159292 A1 * | 7/2006 | Guilbert | ................ | H03F 3/3061 381/120 |
| 2006/0214511 A1 * | 9/2006 | Dayan | ..................... | H04B 1/034 307/38 |
| 2007/0015485 A1 * | 1/2007 | DeBiasio | ............... | H04B 1/082 455/345 |
| 2007/0015486 A1 * | 1/2007 | Marlowe | ............... | G11B 19/025 455/345 |
| 2007/0164821 A1 * | 7/2007 | Sandquist | ..................... | 330/268 |
| 2008/0116979 A1 * | 5/2008 | Lesso et al. | ................ | 330/297 |
| 2008/0156173 A1 * | 7/2008 | Bauer | ............... | 84/601 |
| 2009/0088205 A1 * | 4/2009 | Tanaka | ................... | G01C 21/26 455/556.1 |
| 2010/0022183 A1 * | 1/2010 | Ryle | ........................ | H04H 20/33 455/3.06 |
| 2010/0260350 A1 * | 10/2010 | Chutorash | ............... | B60K 35/00 381/86 |
| 2011/0123040 A1 * | 5/2011 | Hissink | ................. | H03F 1/0277 381/86 |
| 2011/0285460 A1 * | 11/2011 | Murao | ................. | H04B 1/0483 330/124 R |
| 2012/0065815 A1 * | 3/2012 | Hess | ................................ | 701/2 |
| 2012/0146918 A1 * | 6/2012 | Kreiner | ............... | H04M 1/7253 345/173 |
| 2013/0106750 A1 * | 5/2013 | Kurosawa | ..................... | 345/173 |
| 2013/0156226 A1 * | 6/2013 | Huang | ................... | H03G 3/301 381/107 |
| 2014/0056451 A1 * | 2/2014 | El-Hoiydi | ............. | G10L 19/005 381/315 |

FOREIGN PATENT DOCUMENTS

| | | | |
|---|---|---|---|
| EP | 1931038 A2 | | 6/2008 |
| JP | 2007258881 A | * | 10/2007 |
| JP | 2007258881 A | * | 10/2007 |
| WO | 2009043005 A1 | | 4/2009 |
| WO | 2012156029 A1 | | 11/2012 |

OTHER PUBLICATIONS

SoundOnSound Live, p. 3, 2004.*
International Search Report and Written Opinion for PCT/EP2014/072954 dated Apr. 23, 2015.

* cited by examiner

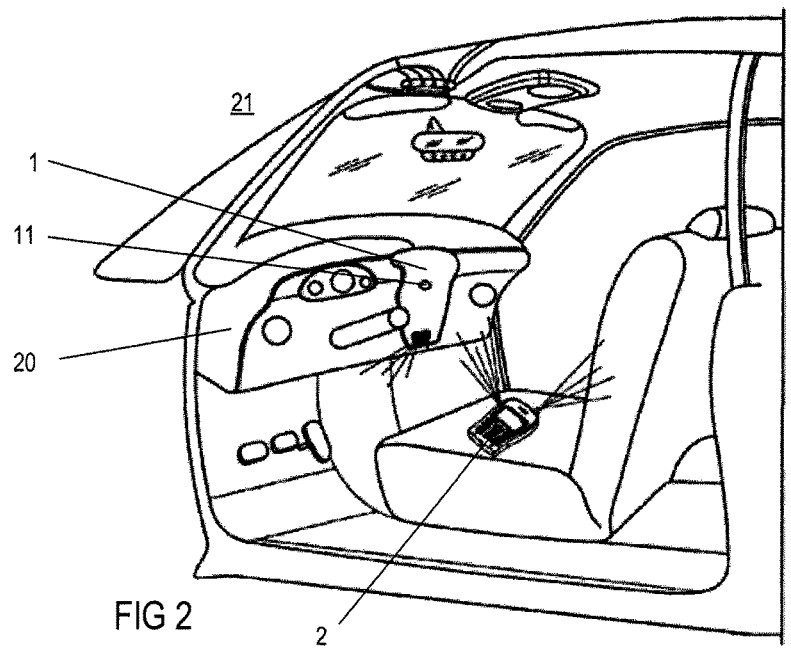
FIG 2
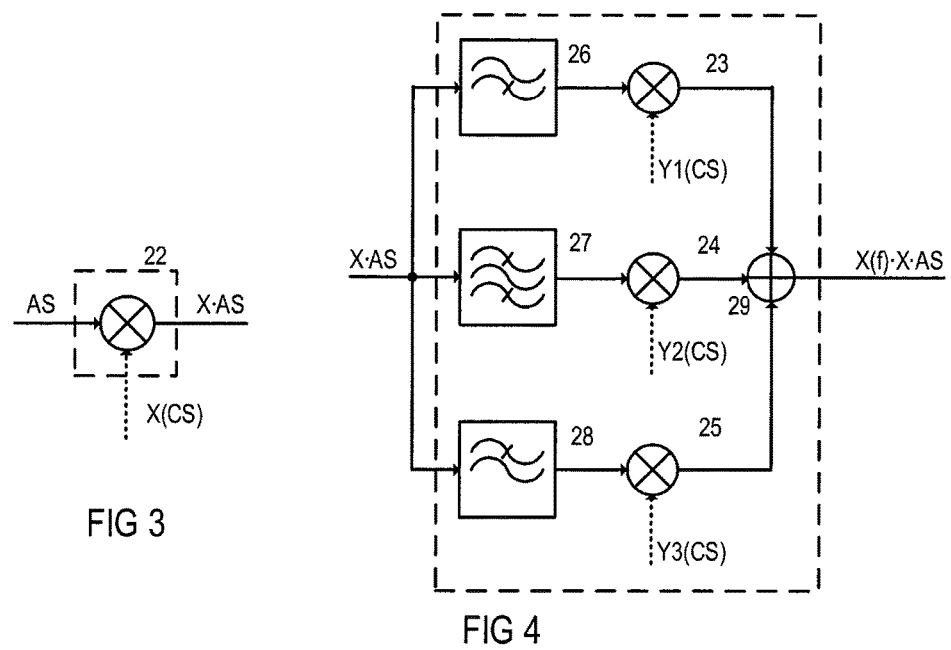
FIG 3
FIG 4

US 10,522,124 B2

INFOTAINMENT SYSTEM

TECHNICAL FIELD

The embodiments described herein relate to an infotainment system, in particular to an infotainment system for a vehicle.

BACKGROUND

Infotainment refers to a type of media that provides a combination of information and entertainment. Infotainment systems in vehicles, sometimes referred to as "in-vehicle entertainment" or "in-vehicle infotainment", are collections of hardware devices installed in vehicles or other forms of transportation to provide audio or audiovisual infotainment including, for example, radio, television, MP3s, automotive navigation or other signal and information processing such as surround sound.

A head unit, sometimes referred to as "deck" or "receiver", is a component of an infotainment system in a vehicle or home cinema system that provides a unified hardware interface for the various components of an electronic media system. The head unit is the centerpiece of the vehicle's sound system. Head units give the user control over the vehicle's entertainment media such as Digital Audio Broadcast (DAB) radio, analog amplitude/frequency modulation (AM/FM) radio, MP3s, Global Positioning System (GPS) navigation, Bluetooth, etc. Head units also afford the user precise control over detailed audio functions such as volume, speaker balance, speaker fade, bass, treble, equalization (EQ) and so on. Several companies are integrating more advanced systems into vehicles' head units that can control vehicular functions such as door chimes and even offer vehicle data such as trouble warnings and odometer information; such head units thus serve as secondary instrument panels. Typically located in the center of the dashboard, modern head units are densely integrated electronic packages fixed in vehicles with detachable faceplates housing graphical user interfaces. As head units are expensive and are therefore common targets for theft, many are integrated into the vehicles' alarm systems.

SUMMARY

An infotainment system for a vehicle may include a controllable audio reproduction arrangement that is configured to be fixed in the vehicle and to acoustically reproduce an audio signal under the control of a control signal. It may further include a portable device that is freely movable in the vehicle and that is configured to provide the audio and control signals for the audio reproduction arrangement, as well as a wireless connection between the portable device and the audio reproduction arrangement configured to transmit the audio and control signals from the portable device to the audio reproduction arrangement. The audio reproduction arrangement has amplification, quiescent power consumption and a maximum output power, of which at least one is controllable by the portable device via the control signal.

Other systems, methods, features and advantages will be, or will become, apparent to one with skill in the art upon examination of the following figures and detailed description. It is intended that all such additional systems, methods, features and advantages be included within this description, be within the scope of the invention and be protected by the following claims.

BRIEF DESCRIPTION OF THE DRAWINGS

The system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

FIG. 2 is a schematic diagram illustrating an application of the infotainment system of FIG. 1 in a car.

FIG. 3 is a circuit diagram of an exemplary controllable amplifier employing a multiplier, which is applicable to the infotainment system of FIG. 1.

FIG. 4 is a circuit diagram of an exemplary controllable filter applicable in the infotainment system of FIG. 1.

DETAILED DESCRIPTION OF THE PREFERRED EMBODIMENTS

Figure 1:
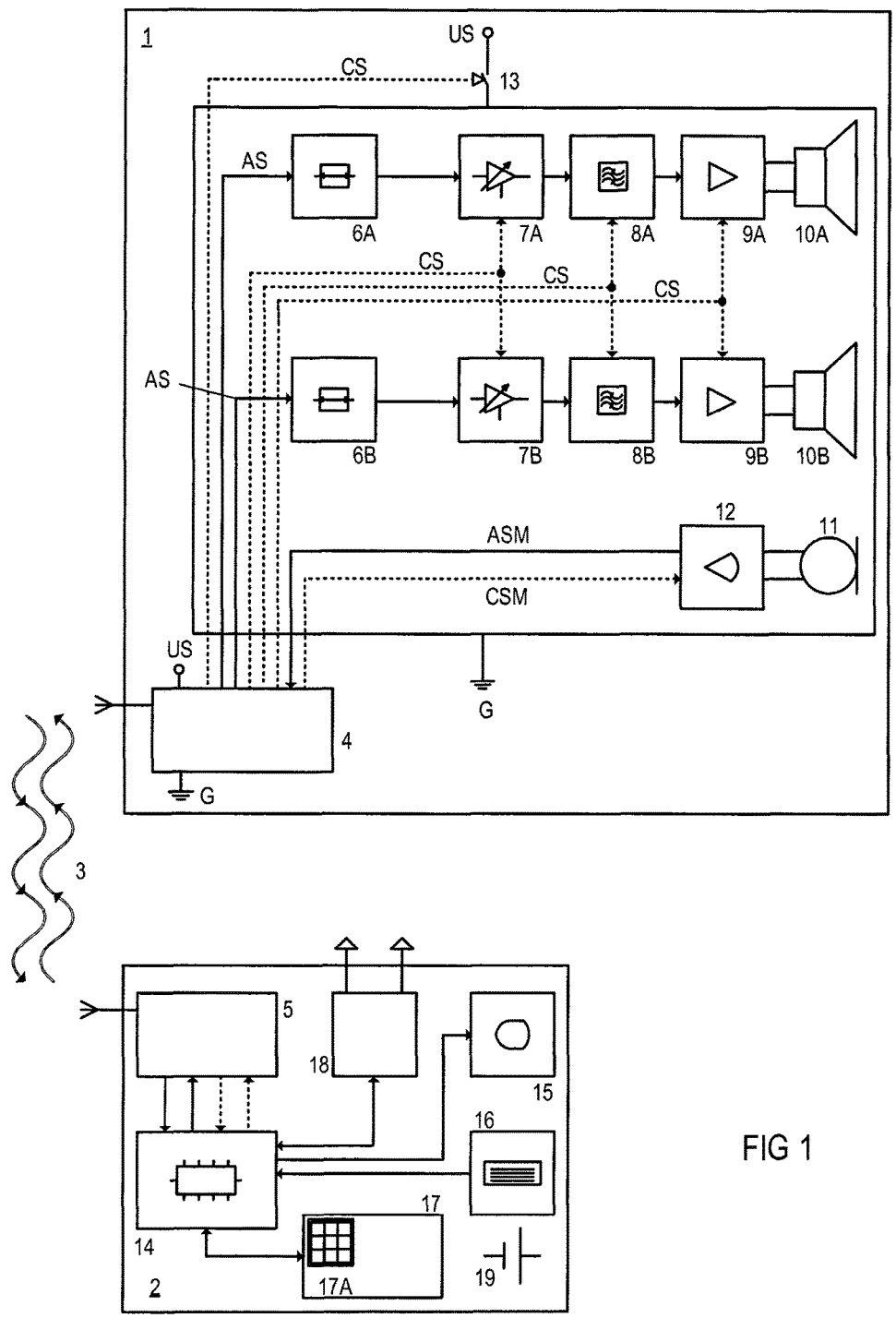
FIG. 1 is a block diagram illustrating an exemplary infotainment system with an audio reproduction arrangement and a portable device.

Referring to FIG. 1, an infotainment system may include a controllable audio reproduction arrangement 1 that may be fixed in a vehicle (not shown) and a portable device 2 that is freely movable in the vehicle. Audio reproduction arrangement 1 may be intended to acoustically reproduce audio signal AS under the control of control signal CS, and portable device 2 may be configured to provide audio signal AS and control signal CS for audio reproduction arrangement 1.

Controllable audio reproduction arrangement 1 and portable device 2 may be connected with each other by wireless link 3 in order to transmit audio signal AS and control signal CS from portable device 2 to audio reproduction arrangement 1. Wireless link 3 may include a transmitter and a receiver, implemented in the present case as transceivers 4 and 5, in order to establish a bidirectional connection that also allows for transmitting signals from audio reproduction arrangement 1 to portable device 2. As shown, transceiver 4 may be integrated into audio reproduction arrangement 1, and transceiver 5 may be integrated into portable device 2. Alternatively, one or both of transceivers 4 and 5 may be arranged separately from audio reproduction arrangement 1 and portable device 2. Transceivers 4 and 5 may employ any known method and standard for exchanging data over short distances using wireless transmission such as wireless local area networks (WLAN), wireless Ethernet (Wi-Fi) or Bluetooth.

For example, Bluetooth operates in the range of 2,400 to 2,483.5 MHz in the globally unlicensed industrial, scientific and medical (ISM) 2.4 GHz short-range radio-frequency band. The transmitted data is divided into packets and each packet is transmitted on one of 79 designated Bluetooth channels. Each channel has a bandwidth of 1 MHz. The first channel starts at 2,402 MHz and continues up to 2,480 MHz in 1-MHz steps. Bluetooth is a packet-based protocol with a master-slave structure. One master may communicate with up to seven slaves in a piconet, which is an ad hoc computer network with all devices sharing the master's clock. Bluetooth provides a secure way to connect and exchange information between devices such as mobile phones, telephones, laptops, Global Positioning System (GPS) receivers, music players and the like. Any Bluetooth device in discoverable mode transmits the device name, device class, list of services and some technical information on demand. Any device may perform an inquiry to find other devices to connect to, and any device can be configured to respond to such inquiries. However, if the device trying to connect knows the address of the device, it always responds to direct connection requests and transmits the information mentioned above, if requested. Use of the device's services may require pairing or acceptance by its owner, but the connection itself can be initiated by any device and held until it goes out of range. Some devices can be connected to only one device at a time; connecting to them prevents them from connecting to other devices or appearing in inquiries until they disconnect from the first device. Every device has a unique 48-bit address. However, these addresses are generally not shown in inquiries.

Many of the services offered over Bluetooth will allow the connecting party to control the Bluetooth device. For security reasons, it is necessary to be able to recognize specific devices and thus enable control over which devices are allowed to connect to a given Bluetooth device. At the same time, it is useful for Bluetooth devices to be able to establish connections without user intervention, for example, as soon as they are in range. To resolve this conflict, Bluetooth uses a process called bonding, and the bond is created through a process called pairing. The pairing process is either triggered by a specific request from a user to create a bond or it is triggered automatically when connecting to the service in which the identity of the device is required for security purposes. These two cases are referred to as "dedicated bonding" and "general bonding", respectively. Pairing often involves some level of user interaction. This user interaction is the basis for confirming the identities of the devices, which stops once pairing successfully completes, when a bond is formed between the two devices, enabling those two devices to connect to each other in the future without requiring the pairing process to confirm the identity of the devices. If desired, the bond can later be removed by the user. During the pairing process, the two devices involved establish a relationship by creating a shared secret known as a link key. If a link key is stored in both devices, they are said to be paired or bonded. In the present case, it is assumed that wireless link 3 is a Bluetooth connection and the two transmitters 4 and 5 are paired and bonded.

In controllable audio reproduction arrangement 1, audio signal AS, which is a stereo audio signal in the present case, and control signal CS, which allows at least for controlling characteristics of audio reproduction arrangement 1, such as the audio signal amplification, spectral characteristic, quiescent power consumption and maximum output power, are recovered by transceiver 4 from the received modulated signal. The stereo audio signal AS is supplied to two delay lines 6A and 6B, where it is delayed by a sufficient amount of time to allow control signal CS to control the above-mentioned characteristics. The delayed audio signal AS is supplied to preamplifiers 7A and 7B, whose amplification may be controlled by control signal CS. By way of preamplifiers 7A and 7B, the overall amplification can be controlled. By way of controllable filters 8A and 8B, which are connected downstream of preamplifiers 7A and 7B, the amplification per frequency can be controlled. Controllable filters 8A and 8B may have at least two controllable frequency ranges, e.g., bass and treble, or a multiplicity of frequency ranges (channels) such as equalizer filter banks. Alternatively, the overall amplification can be controlled via controllable filters 8A and 8B by controlling all filter ranges in the same manner so that controllable preamplifiers 7A and 7B can be omitted. Power driver stages 9A and 9B are connected downstream of controllable filters 8A and 8B and upstream of loudspeakers 10A and 10B. Power driver stages 9A and 9B have quiescent power consumption and a maximum output power that are controllable by the portable device via control signal CS. Exemplary preamplifiers, controllable filters and controllable power driver stages are explained in more detail below with references to FIGS. 3-6.

In the present example, microphone 11 is connected via microphone preamplifier 12, which is controlled by transmitter 4 by way of control signal CSM. Audio signals ASM from microphone 11 are processed by transmitter 4 and transmitted via wireless link 3 from controllable audio reproduction arrangement 1 to portable device 2.

Controllable audio reproduction arrangement 1 may further comprise a controllable switch 13 that is controlled by transmitter 4 and that connects, under the control of transmitter 4, preamplifiers 7A and 7B, controllable filters 8A and 8B, power driver output stages 9A and 9B, microphone 11 and microphone preamplifier 12 to supply voltage US, which is referred to a reference potential, ground G in the present case.

Portable device 2 may include control unit 14 and graphical user interface (GUI) 15, including a display, keyboard 16, memory 17, far-field radio-frequency transceiver 18 such as GSM or the like and battery 19, which provides the power supply for portable device 2, in addition to the already mentioned transceiver 5. Far-field radio-frequency transceiver 18 provides, e.g., mobile telephone connections, mobile internet and other mobile services. Portable device 2 may additionally include a microphone, a loudspeaker and respective amplifiers, which are not shown since they are not required for the purposes discussed herein. Memory 17 may contain software 19, with which certain programs and processes may be implemented in control unit 14. Software 19 may include one or more software applications and provide services and functions similar to those of a common vehicle head unit such as Digital Audio Broadcast (DAB) radio, analog amplitude/frequency modulation (AM/FM) radio, MP3s, Global Positioning System (GPS) navigation and control over detailed audio functions such as volume, speaker balance, speaker fade and frequency characteristics such as bass, treble, equalization (EQ), etc.

Transceiver 4 may output analog or digital audio signal AS and analog or digital control signal CS. Accordingly, the subsequent circuitry may be analog, digital or a blend of both. For the sake of simplicity, no digital-to-analog converters are shown, but each of delay lines 6A and 6B, controllable preamplifiers 7A and 7B, controllable filters 8A and 8B and power driver stages 9A and 9B may accordingly be analog, digital or a blend of both.

Referring now to FIG. 2, controllable audio reproduction arrangement 1, as illustrated above in connection with FIG. 1, may be fixed in dashboard 20 of vehicle 21. Alternatively, controllable audio reproduction arrangement 1 may be disposed in any other position in the car, e.g., under a seat, in the trunk, in or on the center console or under, on or in the rear shelf. Portable device 2 may be a dedicated device or a common smartphone (as shown) on which the head unit functions are implemented by way of one or more software applications (also known as "apps"). Portable device 2 can be carried away from vehicle 21 and thus offers protection from theft. Furthermore, updating the head unit software is much easier since portable device 2 can be easily carried and connected, for example, to a personal computer at home for downloading updates or, in particular with smartphones, the updates can be directly downloaded anywhere via mobile internet.

FIG. 3 is a schematic diagram of an analog or digital multiplier 22 that may be used as a controllable preamplifier like preamplifiers 7A and 7B in the arrangement of FIG. 1. Multiplier 22 receives the delayed audio signal AS and provides as an output signal a multiple X thereof (X·AS), in which X represents the amplification/attenuation and is control signal CS or is determined by control signal CS.

A multiplicity of multipliers 23, 24 and 25 in connection with corresponding frequency selective filters such as high-pass filter 26, midrange filter 27, low-pass filter 28 and adder 29 may be used, as shown in FIG. 4, to realize a controllable filter such as controllable filters 8A and 8B. Signal X·AS is supplied to high-pass filter 26, midrange filter 27 and low-pass filter 28, where it is high-pass filtered, midrange filtered and low-pass filtered. The accordingly filtered signals are amplified/attenuated by multipliers 23, 24 and 25, whose output signals are summed up by adder 29. Multipliers 23, 24 and 25 receive signals YH(CS), YM(CS) and YL(CS) and provide a respective multiple thereof, in which YH(CS), YM(CS) and YL(CS) are determined by control signal CS and represent the amplifications/attenuations in the respective frequency range. Adder 29 provides output signal Y(f)·X·AS, which represents audio signal AS amplified/attenuated by amplification/attenuation X and a frequency-dependent amplification/attenuation Y(f). As mentioned above, a frequency-independent amplification/attenuation such as amplification/attenuation X can alternatively be achieved by equally controlling the frequency-dependent amplification/attenuation Y(f). Besides controlling the amplitude frequency characteristic, other sound properties of the audio signal (audio functions) such as delay time, muting, volume, speaker balance, speaker fade, bass, treble, equalization (EQ) etc. may be controlled as well.

Figure 5:
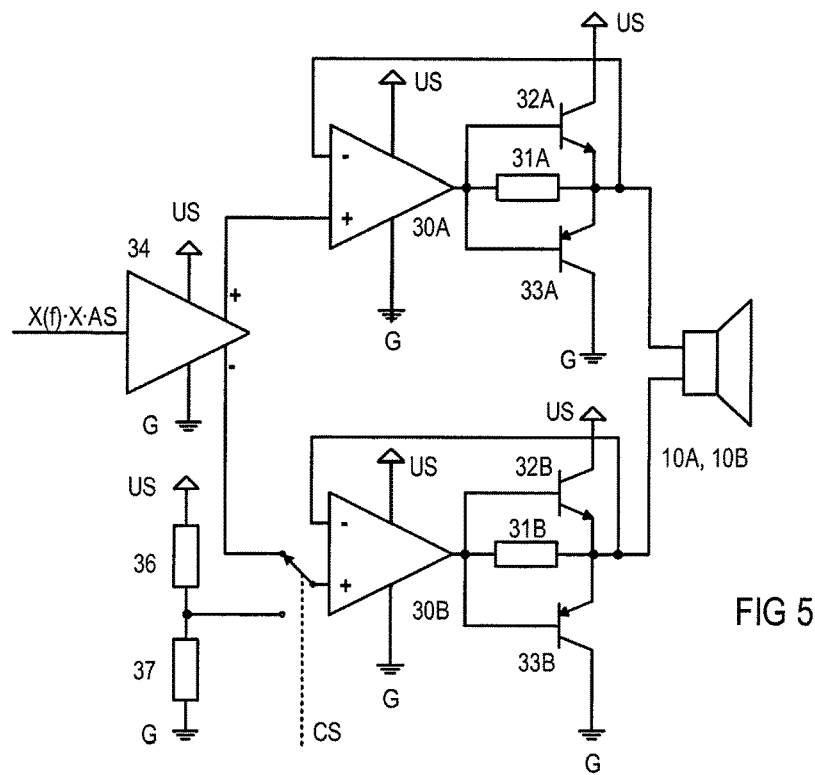
FIG. 5 is a circuit diagram of the first exemplary power driver stage applicable in the infotainment system of FIG. 1.

FIG. 5 illustrates the circuit diagram of a power driver stage such as power driver stages 9A and 9B. The power driver stage of FIG. 5 has a full-bridge structure with two identical bridge branches. Each of the branches includes operational amplifier 30A or 30B, both supplied by supply voltage US and referenced to ground G. The output of operational amplifiers 30A and 30B is connected through resistors 31A and 31B to the output of the respective branch, each branch output being connected to one supply line of loudspeaker 10A or 10B and to its own inverting input. The output of operational amplifier 30A or 30B is further connected to the base line of NPN transistor 32A or 32B and to the base line of PNP transistor 33A or 33B, whose emitters are connected with the branch output. The collector line of transistor 32A or 32B is connected to supply voltage US, and the collector line of transistor 33A or 33B is connected to ground G. Transistors 32A, 32B, 33A and 33B form a bipolar emitter follower.

Preamplifier 34, with two complimentary outputs, is connected upstream of operational amplifiers 30A and 30B. One of the complimentary outputs (+) is connected to the non-inverting input of operational amplifier 30A, and the other (−) is connected to switch 35, which connects the non-inverting input of operational amplifier 30B either with the other (−) complementary output of preamplifier 34 or with a tap of a voltage divider. The voltage divider includes the two resistors 36 and 37 that are series-connected between supply voltage US and ground G. The node between resistors 36 and 37 forms the tap of the voltage divider.

If switch 35 connects the non-inverting input of operational amplifier 30B to the output of preamplifier 34, the driver shown in FIG. 5 is operated as a full-bridge amplifier, also known as an H-bridge amplifier. The term H bridge is derived from the typical graphical representation of such a circuit. An H bridge is built with four transistors or switches. When a first pair of diagonal switches or transistors (e.g., transistors 32A and 33B) are closed and a second pair of diagonal switches or transistors (e.g., transistors 33A and 32B) are open, the voltage across loudspeaker 10A (10B) will be positive. By opening the first pair and closing the second pair, the voltage across loudspeaker 10A (10B) is reversed, allowing reverse operation of loudspeaker 10A (10B). If switch 35 connects the non-inverting input of operational amplifier 30B to the tap of the voltage divider, transistors 32B and 33B are clamped to a certain voltage that is defined by the voltage at the tap of the voltage divider and that is usually half of supply voltage US, whereby resistors 36 and 37 have the same resistance. Transistors 32B and 33B form a half bridge with a reference potential set by the output of the second branch. As can be seen, the half-bridge amplifier provides a maximum output voltage that is half of the maximum output voltage provided by the full-bridge amplifier. Therefore, by switching switch 35 under the control of control signal CS, the maximum output power can be increased or decreased.

Figure 6:
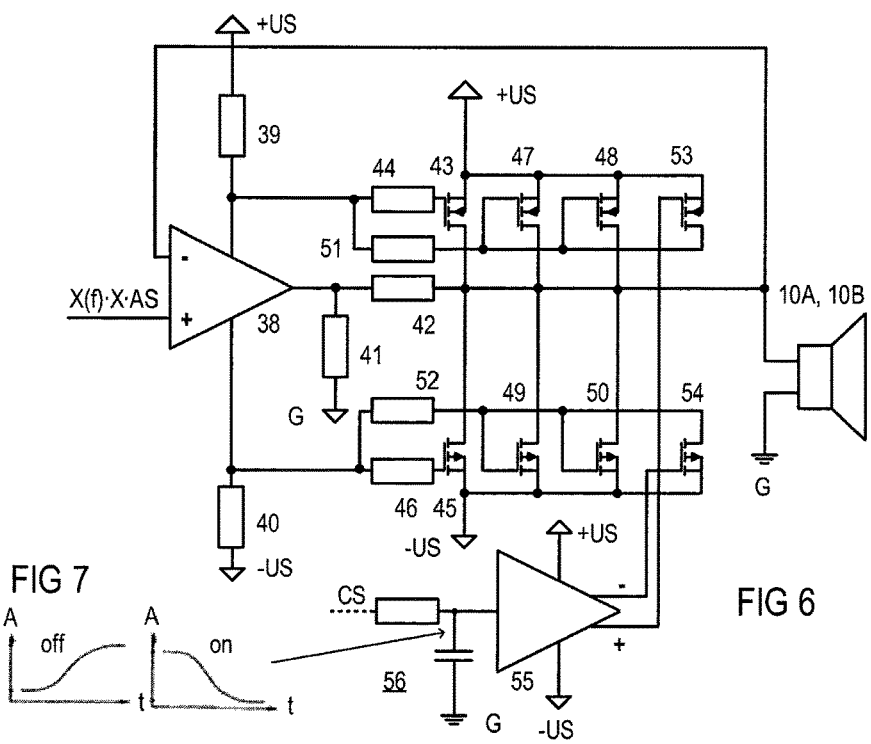
FIG. 6 is a circuit diagram of the second exemplary power driver stage applicable in the infotainment system of FIG. 1.

FIG. 6 illustrates the circuit diagram of another power driver stage, applicable as power driver stages 9A and 9B. The power driver stage of FIG. 6 includes operational amplifier 38, which is supplied via resistor 39 with positive supply voltage +US and resistor 40 with negative supply voltage −US. The output of operational amplifier 38 is connected to ground G via resistors 41 and 42 to the output of the driver stage, to which one line of loudspeaker 10A (10B) and the inverting input of operational amplifier 38 are connected. The other line of loudspeaker 10A (10B) is connected to ground G. A gate line of p-channel metal-oxide-semiconductor (MOS) field-effect transistor 43 is coupled with the node between resistor 39 and operational amplifier 38 via resistor 44. A gate line of n-channel MOS field-effect transistor 45 is coupled with the node between resistor 40 and operational amplifier 38 via resistor 46. Drain lines of transistors 44 and 45 are connected to the output of the driver stage. A source line of transistor 43 is connected to positive supply voltage +US, and a source line of transistor 45 is connected to negative supply voltage −US. Two further n-channel MOS field-effect transistors 47 and 48 are connected with their source lines to positive supply voltage +US and with their drain lines to the output of the driver stage. The base lines of transistors 47 and 48 are connected to each other, to a drain line of n-channel MOS field-effect transistor 53 and, via resistor 51, to the node between resistor 39 and operational amplifier 38. The source line of transistor 53 is connected to positive supply voltage +US. Two further p-channel MOS field-effect transistors 49 and 50 are connected with their source lines to negative supply voltage −US and with their drain lines to the output of the driver stage. The base lines of transistors 49 and 50 are connected to each other, to a drain line of p-channel MOS field-effect transistor 54 and, via resistor 52, to the node between resistor 40 and operational amplifier 38. The source line of transistor 54 is connected to negative supply voltage −US. Base lines of transistors 53 and 54 are connected to differential output lines of preamplifier 55, which is supplied with positive supply voltage +US and negative supply voltage −US, and which receives control signal CS via resistor-capacitor (RC) low-pass element 56.

In the present example, control signal CS allows for softly switching transistors 53 and 54 so that they short-circuit the source lines with the base lines of transistors 47 and 48 and the source lines with the base lines of transistors 49 and 50. This causes transistors 47, 48, 49 and 50 to be inactive under all circumstances. When transistors 47, 48, 49 and 50 are switched off, the quiescent current is generated only by transistors 43 and 45. However, when switching transistors 47, 48, 49 and 50 on, the quiescent current is generated by transistors 43, 45, 47, 48, 49 and 50. Assuming that all transistors 43, 45, 47, 48, 49 and 50 are identical, this means that the quiescent current can be switched by way of control signal CS between full current and one third thereof, as can the quiescent power consumption accordingly.

Figure 7:
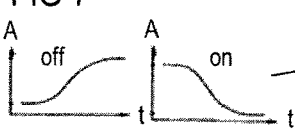
FIG. 7 is a schematic diagram illustrating a softened control signal as amplitude over time for controlling the power driver stage of FIG. 6.

Soft switching means that switching is performed with a switching slope adapted to produce inaudible artifacts in the acoustically reproduced audio signal, which can be achieved, for example, by low-pass filtering a switching signal such as control signal CS. The resulting voltage characteristic (amplitude A over time t) when switching off and on is shown in FIG. 7.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. An infotainment system for a vehicle comprising:
a controllable audio reproduction arrangement that is configured to be fixed in the vehicle and to acoustically reproduce an audio signal under the control of a control signal, wherein the audio reproduction arrangement includes a plurality of amplifier stages arranged in parallel, wherein the audio reproduction arrangement has a maximum output power when each of the plurality of amplifier stages is on, wherein a first amplifier stage is coupled to a circuit element that is controllable by the control signal, wherein the first amplifier stage is on when the circuit element, under the control of the control signal, connects the first amplifier stage to a preamplifier;
a portable device that is freely movable in the vehicle and that is configured to provide the audio signal and the control signal to the audio reproduction arrangement; and
a wireless connection between the portable device and the audio reproduction arrangement configured to transmit the audio signal and the control signal from the portable device to the audio reproduction arrangement; wherein
at the audio reproduction arrangement, the audio signal and the control signal are recovered from a single received modulated signal; and
the audio reproduction arrangement has a reduced output power when the first amplifier stage is off, wherein the first amplifier stage is off when the circuit element, under the control of the control signal received from the portable device via the wireless connection, disconnects the first amplifier stage from the preamplifier.

2. The infotainment system of claim 1, wherein the audio reproduction arrangement is configured to change sound properties of the audio signal under the control of the portable device via the control signal.

3. The infotainment system of claim 1, wherein the audio reproduction arrangement is configured to switch between at least two different quiescent currents under the control of the control signal in order to control the power consumption, each of the at least two different quiescent currents having an amperage greater than zero.

4. The infotainment system of claim 3, wherein the audio reproduction arrangement is configured to switch with a switching slope adapted to produce no audible artifacts in the acoustically reproduced audio signal provided by the audio reproduction arrangement.

5. The infotainment system of claim 1, wherein the audio reproduction arrangement has a maximum output power level and is configured to switch between at least two different maximum output power levels under the control of the control signal in order to control the power consumption.

6. The infotainment system of claim 5, wherein the audio reproduction arrangement is configured to switch with a switching slope adapted to produce no audible artifacts in the acoustically reproduced audio signal provided by the audio reproduction arrangement.

7. The infotainment system of claim 1, wherein the audio reproduction arrangement is configured to switch on and off under the control of the control signal in order to control the power consumption.

8. The infotainment system of claim 7, wherein the audio reproduction arrangement is configured to switch with a switching slope adapted to produce no audible artifacts in the acoustically reproduced audio signal provided by the audio reproduction arrangement.

9. The infotainment system of claim 1, wherein the portable device is configured to form a head unit of the infotainment system and comprises the basic infotainment functionality.

10. The infotainment system of claim 9, wherein the basic infotainment functionality comprises at least one of the following: navigation system, media player, hands-free telephone and radio receiver.

11. The infotainment system of claim 9, wherein the portable device further comprises a graphical user interface with which graphical information is input and output, but audio signals are output via the audio reproduction arrangement.

12. The infotainment system of claim 9, wherein the portable device is a smartphone with a digital data processing unit and wherein the basic infotainment functionality is implemented via at least one software application in the digital data processing unit.

13. The infotainment system of claim 1, wherein the wireless connection is further configured to transmit a further audio signal from the audio reproduction arrangement to the portable device.

14. The infotainment system of claim 13, further comprising a microphone arrangement that is configured to be fixed in the vehicle and to generate the further audio signal.

15. The infotainment system of claim 1, wherein the audio reproduction arrangement comprises at least one controllable audio amplifier and at least one loudspeaker connected to the at least one audio amplifier.

16. The infotainment system of claim 1, wherein the wireless connection comprises:
a portable transmitter connected to the portable device and
a receiver connected to the audio reproduction arrangement and configured to be fixed in the vehicle.

17. The infotainment system of claim 16, wherein an audio signal delay path configured to delay the audio signal is connected between the receiver of the wireless connection and the audio reproduction arrangement.

18. The infotainment system of claim 1, wherein the audio reproduction arrangement is configured to switch between at least two different quiescent currents under the control of the control signal in order to control the power consumption, each of the at least two different quiescent currents having an amperage greater than zero.

19. The infotainment system of claim 18, wherein the audio reproduction arrangement is configured to switch with a switching slope adapted to produce no audible artifacts in the acoustically reproduced audio signal provided by the audio reproduction arrangement.

20. The infotainment system of claim 1, wherein the audio reproduction arrangement comprises:
   a receiver for receiving the modulated signal via the wireless connection; and
   a set of delay lines connected to the receiver for carrying the recovered audio signal.

21. The infotainment system of claim 20, wherein the set of delay lines delay the recovered audio signal based on a time required for the recovered control signal to control a quiescent power consumption or the maximum output power of the recovered audio signal.

\* \* \* \* \*